D. R. PAISTE.

HARVESTER.

No. 3,277. Reissued Jan. 26, 1869.

Witnesses:
George E. Buckley
W. A. McKinley

Inventor:
David R. Paiste

THE NORRIS PETERS CO., WASHINGTON, D. C.

D. R. PAISTE.

HARVESTER.

No. 3,277. Reissued Jan. 26, 1869.

Witnesses:
W. A. McKinley
George E. Buckley

Inventor
David R. Paiste

THE NORRIS PETERS CO., WASHINGTON, D. C.

United States Patent Office.

DAVID R. PAISTE, OF WILLISTOWN, PENNSYLVANIA, ASSIGNEE, BY MESNE ASSIGNMENTS, OF HIMSELF.

*Letters Patent No.* 55.427, *dated June* 5, 1866; *reissue No.* 3,277, *dated January* 26, 1869.

IMPROVEMENT IN HARVESTERS.

The Schedule referred to in these Letters Patent and making part of the same.

*To all whom it may concern:*

Be it known that I, DAVID R. PAISTE, of Willistown, Chester county, Pennsylvania, have invented an Improvement in Harvesting-Machines; and I do hereby declare the following to be a full, clear, and exact description of the same, reference being had to the accompanying drawings, and to the letters of reference marked thereon.

My invention consists of certain devices, fully described hereinafter, whereby the finger-bar of a harvester may be firmly secured to the frame of the machine, and yet may readily adjust itself at any required angle to the frame, when the surface of the ground is so irregular as to render such adjustment necessary.

In order to enable others skilled in the art to make and use my invention, I will proceed to describe its construction and operation.

In the accompanying drawings, forming part of this specification—

Figure 1:
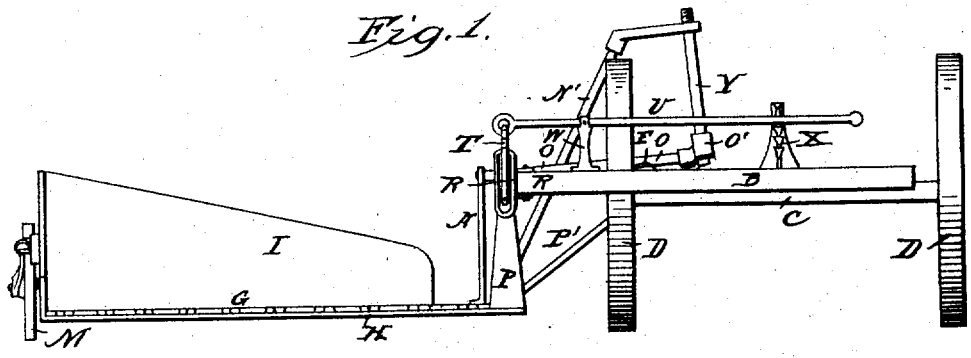
Figure 1 is a front elevation of a harvester, with my improvement attached.
Figure 2:
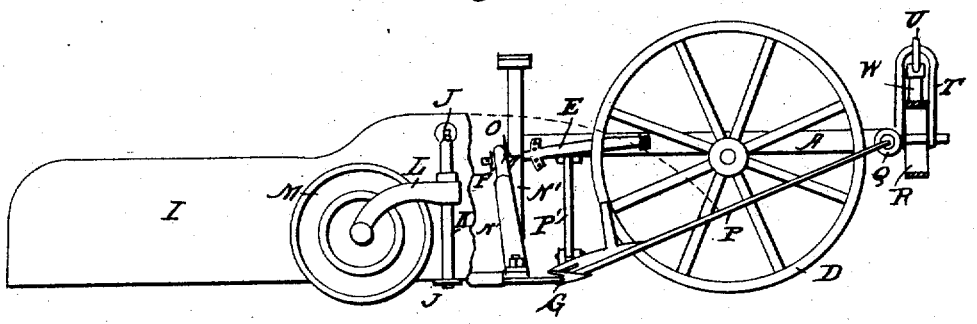
Figure 2 is a side elevation of the same.
Figure 3:
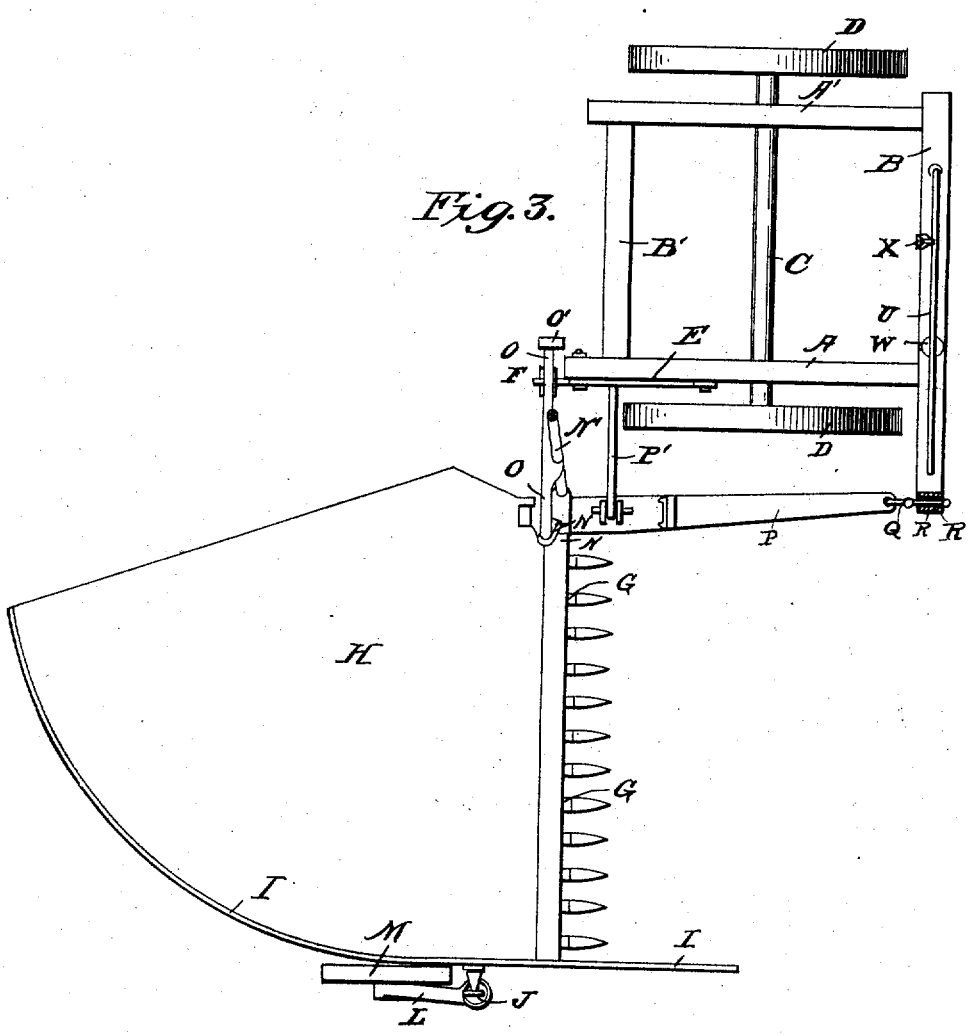

Figure 3, a plan of the same.

A and A′ are the side beams, and B and B′ are the end beams of a frame, which rests on an axle, C, and to the ends of the latter are secured the wheels D D.

To the outer side of the beam A is hung an adjustable lever, E, and on the end of the latter, which projects beyond the beam, turns a grooved pulley, F.

To the finger-bar G is connected the usual platform, H, and on the outside of a flange, I, are secured brackets J J, between which extends a rod, K. On a pin, projecting from an arm, L, which is adjustable on the rod K, turns a pulley, M, the latter bearing on the ground, and maintaining the outer edge of the platform H free from contact with the same.

From braces N N′, near the inner end of the finger-bar, extends a horizontal rod, O, which rests in the grooved pulleys F, and on the end of which is a shoe, O′, in which rests an upright rod, Y, to the upper end of which a revolving head may be attached, for the rake-arms, thus forming a rake-standard, rigidly attached to the platform, but supported on the main frame, adjusting itself to different heights of cut of the finger-beam; and to the inner end of the cutter-bar is also secured one end of the draw-bar P, to which is connected one end of a brace, P′, the latter being secured at its opposite end to the beam B′.

The forward end of the draw-bar is connected to a staple, Q, which passes through a slotted plate, R, on the end of the beam B, and which is hung to a link, T, suspended from the end of a lever, V, the latter vibrating on a pin in the upper end of an upright, W, secured to the cross-beam B, to which is also attached an upright, X, with a series of notches adapted for the reception of the lever U.

In harvesters of the ordinary construction, the finger-bar is connected to the frame of the machine, either by double hinges or by one or two braces, similar to the brace P′, the latter being weak, and liable to be broken or injured, when there is any considerable resistance to the forward motion of the bar.

In the above-described machine, the finger-bar is suspended between the pulley M and the rod O, so that the brace P cannot be strained or otherwise injured by any resistance to the forward motion of the bar, while the latter can readily adjust itself to any required angle to the frame, when the surface of the ground is irregular, the expensive and heavy hinges usually employed for this purpose being thus dispensed with.

It will be seen also, that by adjusting the lever E, the inner end of the finger-bar can be secured at any desired distance above the surface of the ground. If desirable, however, the pulley F, which is on the end of this lever E, may turn on a fixed pin, projecting from the frame of the machine.

What I claim as my invention, and desire to secure by Letters Patent, is—

1. The combination, in a two-wheel harvesting-machine, with rear cut, of a hinged finger-beam and platform, a support for a revolving rake, connected therewith, and a lever, attached to the front end of the drag-bar, for raising, lowering, and inclining the fingers and finger-beam.

2. A lever, attached to the front end of the drag-bar, and arranged in front of the carrying-axle, and at right angles, or nearly so, to the path of the driving-wheels, so as to be convenient to the driver, while riding in his seat.

3. The combination, in a two-wheel harvesting-machine, of a flexible finger-beam, a revolving rake-standard connected therewith, and a device for raising, lowering, and inclining the finger-beam and rake-standard, operated by the driver, while riding on a seat supported by the main frame.

DAVID R. PAISTE.

Witnesses:

GEORGE E. BUCKLEY,
W. A. A. MCKINLEY.